United States Patent [19]
Zwick

[11] Patent Number: 5,282,590
[45] Date of Patent: Feb. 1, 1994

[54] METHOD AND APPARATUS FOR HEATING AND DELIVERING DEICING FLUIDS

[76] Inventor: Eugene B. Zwick, 16841 Edgewater La., Huntington Beach, Calif. 92649

[21] Appl. No.: 950,208

[22] Filed: Sep. 24, 1992

Related U.S. Application Data

[62] Division of Ser. No. 635,259, Dec. 28, 1990.

[51] Int. Cl.⁵ ............................................. D64D 15/00
[52] U.S. Cl. ........................ 244/134 C; 244/134 R; 222/146.2; 239/131; 239/135; 239/172
[58] Field of Search ...................... 244/134 C, 134 R; 222/146.2; 239/130, 131, 135, 172

[56] References Cited

U.S. PATENT DOCUMENTS

| | | | |
|---|---|---|---|
| 2,839,339 | 6/1958 | Sackett | 239/130 |
| 4,073,437 | 2/1978 | Thorton-Trump | 239/131 |
| 4,090,668 | 5/1978 | Kochenour | 239/135 |
| 4,333,607 | 6/1982 | Mueller et al. | 239/131 |
| 4,723,733 | 2/1988 | McClinchy | 244/134 R |
| 4,986,497 | 1/1991 | Susko | 244/134 R |
| 5,028,017 | 7/1991 | Simmons et al. | 244/134 C |

Primary Examiner—Mitchell J. Hill
Assistant Examiner—Christopher P. Ellis
Attorney, Agent, or Firm—Daniel L. Dawes

[57] ABSTRACT

A storage tank is used to store a large quantity of pseudoplastic deicing fluid. The fluid is stored at an ambient storage temperature. The storage tank has an outlet which is preferably a valve located on the floor of the tank. A heater is provided to rapidly heat only a portion of the fluid in the tank to a required delivery temperature estimated at between 160 and 180 degrees Fahrenheit. Once a portion of the fluid is heated to the appropriate temperature, the valve is opened and the heated fluid is delivered out of the tank through the valve. Heat is transferred to the fluid in a heating area creating a predetermined dynamic temperature pattern within the fluid when the outlet is in the closed position and a predetermined steady state temperature pattern within the fluid when the outlet is in the open position.

The predetermined steady state temperature pattern is defined by the fluid flowing through the outlet being at the delivery temperature, the fluid flowing through a delivery area being heated to the delivery temperature, and the fluid flowing from the stored area to the delivery area being heated to approach the delivery temperature according to its relative distance from the outlet.

5 Claims, 8 Drawing Sheets

METHOD AND APPARATUS FOR HEATING AND DELIVERING DEICING FLUIDS

This is a divisional of copending application Ser. No. 07/635,259 filed Dec. 28, 1990.

BACKGROUND OF THE INVENTION

1. Field of the Invention

This invention relates to the field of aircraft deicers, specifically to the rapid heating and delivery of deicing fluids, and especially to rapid heating and delivery of high viscosity nonconvective or pseudoplastic deicing fluids.

2. The Prior Art

Definitions

Deicing

Aircraft deicing is the process of removing snow and ice from the wings, tail and other aircraft surfaces, while the plane is on the ground. Deicing is accomplished by spraying hot deicing fluid on the aircraft surfaces.

Anti-Icing

Anti-icing is the proces of preventing ice and/or snow accumulation between the time the aircraft is deiced and the time it takes off. Anti-icing is accomplished by providing a low freezing point deicing fluid on the aircraft surfaces after the deicing/anti-icing operation has been completed.

Deicers

Aircraft deicing and anti-icing are generally accomplished by the use of vehicles, called deicers, which incorporate the following elements: one or more tanks to carry deicing fluids; a means for raising the temperature of the deicing fluid from its storage temperature to the desired spraying temperature; a pump to raise the fluid pressure to a level adequate for spraying; plumbing including hoses and spray nozzles to permit the fluid to be applied to the aircraft; and a boom carrying a basket, or a ladder with a platform at the top to allow the operator to raise the spray nozzle off the ground to a height sufficient for proper application of the deicing fluid.

Deicing Fluids

General

There are three types of deicing fluids in widespread use. Hot water is used by some airlines for deicing (removal of snow and/or ice). It is not suitable for anti-icing. Type I deicing fluid, a mixture of ethylene glycol and water, is the principal deicing fluid used in the United States. Type II deicing fluid (a mixture of propylene glycol, diethylene glycol, a long chain polymer and water) is the principal deicing fluid used in Europe.

Hot Water

Pure hot water is used by some airlines to remove the snow and/or ice accumulations from aircraft. It is readily available, is relatively inexpensive, and does not pose an environmental hazard. Water does not provide any anti-icing protection, and in fact could be the source for ice formation at subfreezing ambient temperatures. It must therefore be followed by the application of a low-freezing-point deicing fluid to provide anti-icing protection.

Type I Deicing Fluid

The Type I deicing fluid which is most widely used in the United States is a mixture of ethylene glycol and water. One commercially available Type I fluid includes 50% water and 50% ethylene glycol. Pure ethylene glycol freezes at 9 degrees F., but the 50/50 mixture with water freezes at −33 degrees F. An alternative 60/40 mixture of ethylene glycol and water freezes below −80 degrees F. Type I fluid provides anti-icing protection, since any snow or freezing rain falling on the aircraft will mix with the residual Type I fluid remaining on the surface to form a non-freezing liquid. Type I fluid has a relatively low viscosity, and therefore flows off the aircraft surfaces quickly. It provides only a short period of deicing protection, on the order of a few minutes in severe weather. Type I deicing fluid is considered to be an environmental hazard, and its use is increasingly being subjected to restrictions in the United States and elsewhere.

Type II Deicing Fluid

Type II fluid is the most widely used deicing fluid in Europe. It is a mixture of propylene glycol and diethylene glycol with water, to which a long chain polymer has been added to provide the desired "pseudo-plastic" viscous properties. The fluid can be sprayed mixed with additional water, or as the "neat" (undiluted) Type II fluid. A typical Type II fluid might have a freezing point of −36 degrees F. The 50/50 mixture of this Type II fluid with water freezes at 14 degrees F. It poses less of an environmental hazard than Type I fluid. The viscosity of Type II fluid is dependent on the velocity at which air flows over the fluid resting on the aircraft surfaces. It has a very high viscosity when the aircraft is stationary or moving at low speed. It therefore stays on the aircraft surfaces after spraying, preventing icing prior to takeoff. The viscosity of the fluid decreases rapidly as the aircraft picks up speed when it starts to move down the runway. Virtually all of the deicing fluid flows off the aircraft before it rotates for takeoff. This avoids a degradation of the aerodynamic characteristics of the aircraft in flight. The viscous behavior of Type II fluid allows it to provide much better anti-icing protection than Type I fluid. Anti-icing protection with a typical Type II fluid lasts for a minimum of twenty minutes, and under some conditions for several hours.

One widely used commercially available Type II fluid contains a small percentage (less than 2%) of a long chain polymer. This polymer provides the fluid with its desirable viscosity behavior. Unfortunately, this long chain polymer can be easily damaged so that the fluid degrades (loses its desired viscous properties). Mechanical degradation can occur under flow conditions which generate shear between adjacent layers of fluid. Thermal degradation can occur by exposure to high temperature surfaces, or by storage of the fluid at elevated temperatures. Mechanical degradation of Type II fluid can occur if the fluid flows through a centrifugal pump because of the turbulence generated by passage of the vanes through the fluid. Degradation also occurs when the fluid flows through a passage at velocities over six feet per second, or passes at comparable velocities over sharpedged surfaces, or undergoes flow separation. Flow turbulence due to high velocities or turbulence promoters that are commonly used in high performance heat exchangers could also severely degrade Type II fluid.

Thermal degradation of Type II fluid can occur if the fluid is stored at high temperature. For instance, the aforementioned widely used Type II fluid must not be stored over 158 degrees F. for any extended period of time. The fluid also degrades when exposed to surfaces at temperatures above 248 degrees F. Under these conditions, the long chain polymer "plates out" on the hot surface, causing the fluid to degrade, and interfering with heat transfer from the hot surface to the fluid. These thermal degradation problems make it difficult to design a system for heating the fluid for use in a deicer. Because Type II fluid has superior anti-icing properties, some airlines use cold "neat" Type II fluid as a part of a two-step deicing process. First the aircraft is deiced using a hot fluid, which might be a mixture of Type II with water, or even a Type I deicing fluid, and then "neat" Type II fluid is applied to achieve anti-icing.

Deicer Tanks

Deicing fluid is generally stored in large tanks which hold many thousands of gallons. The fluid is transferred from the storage tanks into tanks mounted on the deicer vehicles. In many applications, water is also loaded into the tanks on the deicing vehicle. Sometimes the water is loaded into the same tank as the deicing fluid to provide a premixed fluid of a fixed mixture ratio to be sprayed. In other cases, the water is loaded into a separate tank. This makes it possible to spray pure water, pure deicing fluid or any desired mixture of the two.

Fluid Heating
Temperatures

Deicing fluids are expensive, and in varying degrees environmentally hazardous, so it is desirable to deice an aircraft with the least possible amount of fluid. This requires heating the fluid to be sprayed for deicing to a high temperature, on the order of 160 to 180 degrees F. Temperatures above 200 degrees F. are undesirable because excessive steam obscures the deicing operation. Temperatures below 160 degree F. require too much deicing fluid.

Heat Sources

Several different heat sources can be used to heat deicing fluid from the storage temperature to the spraying temperature. These include direct fired heaters, electric heaters and heat derived from an internal combustion engine. Large deicers usually use direct fired heaters burning gasoline or diesel fuel to heat the deicing fluid.

Slow Heating Of Premixed Fluids

Deicers which use direct fired heaters transfer heat from the combustion products to the deicing fluid by means of a heat exchanger. The deicing fluid is premixed in the tank. It is drawn from the tank and pumped through the direct fired heater heat exchanger and then returned to the tank. As the fluid circulates from the tank to the heater and then back to the tank, the temperature of the fluid stored in the tank increases. When the heater discharge temperature (or the stored fluid temperature itself) reaches the desired spraying temperature, the deicing fluid is ready to be sprayed onto the aircraft. The heat release rate of most current burners, as compared to the size of typical deicer tanks, normally result in a tank heat-up time on the order of 45 minutes or more. This process does not produce rapid heating and delivery of the deicing fluid mixture.

Slow Heating Of Separate Fluids

Current deicers also have systems in which the water and deicing fluids are not premixed. In this case, there are deicers in which water is heated in a direct fired burner and then circulated through the a heat exchanger placed in the deicing fluid tank. The entire water flow is passed through the deicing fluid tank for a period of about 45 minutes in order to heat the deicing fluid to the desired temperature for spraying. Then all of the water flow is diverted to a mixer where it is mixed with the preheated deicing fluid from the deicing fluid tank. This process is not suitable for rapid heating and delivery of deicing fluid mixtures.

Rapid Heating

There is now increasing interest in reducing the time needed to heat the deicing fluid to the spraying temperature. One method of current interest is to use a heater with a heat output sufficient to heat the fluid from the storage temperature to the desired spraying temperature in a single pass. This eliminates the time required to heat the entire tank, but it requires a heater with much higher heat output than is required for the recirculation type of heating.

Several organizations, however, have now developed heaters large enough to provide the heat necessary for single pass heating. The current technology of rapid heating is limited to heating pure water or a mixture of pure water and deicing fluid which have been mixed in the tank prior to heating. Passing the fluid through a direct fired heater is suitable for water and Type I fluids, but it may not be suitable for heating Type II fluids. The repeated pumping of the fluid from the tank through the heater and then back to the tank in a recirculating system can cause thermal and/or mechanical degradation of the fluid. The fluid can be degraded by exposure to the high temperature surfaces of the heat exchanger. Direct fired heaters generally have combustion products at temperatures of between 1000 degrees F. and 3500 degrees F. It is difficult to avoid excessive wall temperatures in the heat exchanger tubing used to heat the fluid in a direct fired system. Direct fired heater exchangers usually require high fluid velocities and turbulent flow within the heat exchanger tubing to achieve the compact heat exchanger size required for a practical system. High velocity and turbulent flow cause Type II fluid degradation. Prior to the present invention, there have been no successful method of rapid heating of variable proportions of water and deicing fluids, and no successful method for rapid heating of Type II deicing fluid and/or variable mixtures of Type II fluid with water.

OBJECTIVES OF THE PRESENT INVENTION

Rapid Heating Of Varying Water And Deicing Fluid Mixtures

One current need which is met by the present invention is a method of rapidly heating and delivering a mixture of water and deicing fluid in varying proportions, where the water and deicing fluid are not premixed in the storage tank. The method must allow delivery of heated or cold mixtures varying from pure water to pure deicing fluid or any mixture in between. It must also be suitable for heating and delivering premixed fluids.

Rapid Heating Of Type II Deicing Fluid With Low Degradation

Another current need is a method for rapidly heating and delivering deicing fluids such as Type II fluid which are subject to mechanical and/or thermal degradation, either as pure fluids or mixed in any desired proportion with water. To accomplish one must avoid the high velocities, turbulence or high surface temperatures which can degrade the physical properties of a deicing fluid such as Type II deicing fluid.

Mixing Considerations

A deicer can store two (or more) fluids in separate tanks, and then mix the fluids before they are sprayed onto the aircraft, either before or after one or both of the fluids are heated. For example, water might be stored in one tank, and Type I fluid in the other. If a 50/50 mixture is to be sprayed, equal flows of both fluids could be pumped, mixed, heated and sprayed. Fluid mixing can be accomplished in the tank before pumping, in the system before heating, or in the system after heating, but before the fluid is sprayed. But is it important that the mixture being sprayed be uniform, since the freezing point of the mixture might be below −30 degrees F., while the freezing points of the individual fluids are both above zero F.

Methods of Rapid Heating

Rapid Heating Of Premixed Deicing Fluid

One rapid heating system which is in current use involves passing the fluid to be heated through a direct fired heater. This prior art method is shown in FIG. 1. The fluid is drawn from the tank 100 by pump 103 at the tank storage temperature. It then passes through the heat exchanger 101 which is a part of the heater 102 where it is heated by the combustion products derived from the burner. The burner and heat exchangers are sized so that when the fluid is pumped through the heat exchanger at the flow rate required for deicing the aircraft, the temperature of the fluid increases in one pass from the fluid storage temperature to the desired spraying temperature. It is then sprayed onto the aircraft through spray nozzle 104. A pressure relief valve 107 is provide to allow the fluid to flow back to the tank when the spray nozzle 104 is closed. This valve 107 also establishes the pressure for the flow through the spray nozzle 104.

This method of rapid heating is applicable to water or premixed Type I fluid which is not damaged by high heat exchanger surface temperatures and high velocity turbulent flow. It may not be applicable to Type II fluid which could be mechanically or thermally degraded by its passage through the heat exchanger.

Application Of Cold Type II Fluid After Deicing

The deicing system discussed above can be supplemented by an anti-icing system. The prior art depiction in FIG. 2 shows the system of FIG. 1, supplemented by a second tank 200 and pump 203 which is used for application of cold Type II fluid for anti-icing through spray nozzle 204. This deicing and anti-icing method is currently in use and is not a part of the present invention.

BRIEF SUMMARY OF THE INVENTION

One method of rapidly heating a varying mixture of water and deicing fluid is to heat the fluids directly by allowing the fluids to flow together just before heating. The two fluids are stored in separate tanks. Each fluid is pumped from the separate tanks in the desired proportions. They are then allowed to join together into a single flow as they pass through a high output heater. The passage of the fluids through the heater will provide the heat necessary to achieve the desired discharge temperature. The stirring action associated with the flow of the fluids through the heater will thoroughly mix the fluids prior to spraying them onto the aircraft. In this way rapid heating can be achieved of any desired mixture of water and deicing fluid which can be allowed to flow through the heater. This is no problem for Type I fluid mixtures, but may not be desirable for Type II fluid mixtures.

Another method of rapidly heating a varying mixture of water and deicing fluid is to heat one of the fluids indirectly. This can be done by putting all of the required heat into one fluid, preferably the water, and then transferring heat as required to the second fluid prior to mixing. Again the two fluids are stored in separate tanks. Water is pumped its tank at a flow rate equal to the desired total flow rate of the water/deicing fluid mixture. The water is heated as it flows through a high output heater, absorbing all of the heat needed to heat the final mixture. The water flow is then divided into two separate streams. The first stream of water (needed for the mixture to be sprayed) flows to a mixing device. The second stream of water flows to a heat exchanger. The deicing fluid is pumped from its tank to the same heat exhanger at the rate necessary to provide the desired final mixture proportions. The second water stream transfers heat to the deicing fluid in the heat exchanger so as to provide the desired deicing fluid temperature. The heated deicing fluid is then mixed with the first stream of water and the mixture is sprayed onto the aircraft. In this way rapid heating can be achieved of any desired mixture of water and deicing fluid. Because this does not require the deicing fluid to flow through the heater, it has application to both Type I and Type II fluids.

As noted above, this involves transferring the heat from a direct fired burner or other heat source to a first fluid, such as water, which does not suffer from degradation limitations, and then to transfer heat from the first fluid to the Type II deicing fluid. High temperature degradation can be avoided by limiting the temperature of the first fluid to an acceptable value. The fluid-to-fluid heat exchanger can be small because of higher heat transfer rates, with lower fluid velocities on the water side. This can lead to reduced turbulence on the Type II fluid side. The heat exchanger can be used to heat only the fluid which is about to be sprayed, resulting in rapid single pass heating.

The heat exchanger used to heat the Type II fluid is a major factor in limiting the degradation of the fluid. It can be external to the tank, but there may not be sufficient space to install a heat exchanger adequate cross section to keep the fluid velocities down to the required level. Another method of indirectly heating the fluid to be sprayed, which provides a minimum of fluid degradation, is to heat the fluid as it rests in the tank before it is pumped for spraying on the aircraft. When heating a conventional fluid, this is a straightforward matter, involving the introduction of a heat source into the tank, and distribution of the heat to all of the fluid in the tank by means of thermal convection or mechanical stirring. This method is frequently used when the fluid is heated electrically, and has been used with circulation of a hot fluid through tubes located in a tank. However, this method presents may problems when applied to a tank filled with Type II deicing fluid.

Another aspect of the invention is a heating and delivery system for an aircraft deicer which is most suitable for heating high viscosity Type II deicing fluid having pseudoplastic material properties, but could be applied to any nonconvective fluid or poorly convective fluid.

A storage tank is used to store a large quantity of pseudoplastic deicing fluid. The pseudoplastic fluid has material properties whereby it has a relatively stationary consistency at low temperatures and its flow rate increases as its temperature increases. The fluid is stored at an ambient storage temperature thereby eliminating the possibility of thermal degradation of the fluid being stored at high temperatures.

The storage tank has an outlet which is preferably a valve located on the floor of the tank. The valve has a closed position adapted to contain the fluid within said tank, and the valve further has an open position adapted to allow heated fluid to flow out of the bottom of the tank through the open valve.

A heater is provided to rapidly heat only a portion of the fluid in the tank to a required delivery temperature estimated at between 160 and 180 degrees Fahrenheit. Once a portion of the fluid is heated to the appropriate temperature, the valve is opened and the heated fluid is delivered out of the tank through the valve. The non-heated portion of the fluid is thereby further protected from thermal degradation.

The rapid heater preferably comprises a heat exchanger including a plurality of vertically aligned and horizontally disposed rows of tubes adapted to allow liquid to flow therethrough and a plurality of fins in contact with said rows of tubes. A liquid heater is also included for heating the liquid outside of said tank; and a pump is included for pumping the heated liquid into said tubes along a path through said tubes most adjacent said outlet and then through said tubes progressively farther away from said outlet.

Heat is transferred from the heated liquid to the walls of the tubes to the fins and to the fluid in the heating area creating a predetermined dynamic temperature pattern within the fluid when the outlet is in the closed position and a predetermined steady state temperature pattern within the fluid when the outlet is in the open position.

The predetermined dynamic temperature pattern is defined by the fluid in a delivery area in the tank closest to the outlet being heated to a delivery temperature, the fluid in a stored area in the tank farthest from the outlet being at the ambient storage temperature, and the fluid between the delivery area and the stored area approaching the delivery temperature according to its relative distance from the outlet.

The predetermined steady state temperature pattern is defined by the fluid flowing through the outlet being at the delivery temperature, the fluid flowing through the delivery area being heated to the delivery temperature, and the fluid flowing from the stored area to the delivery area being heated to approach the delivery temperature according to its relative distance from the outlet.

While the specification concludes with claims pointing out and distinctly claiming the subject matter which is regarded as the invention, it is believed that the invention, the object and features of the invention and further objects, features and advantages thereof will be better understood from the following detailed description taken in connection with the accompanying drawings.

The invention is better understood by now turning to the following detailed description.

DETAILED DESCRIPTION OF THE PREFERRED EMBODIMENTS

This invention allows a deicer to apply hot deicing fluid to an aircraft on the ground within a few minutes after the deicer tanks have been filled with cold deicing fluids. This invention provides new fluid pumping and heating systems for use in single pass heating of deicing fluids. It allows rapid heating of pseudoplastic deicing fluids which would degrade (lose their desirable physical properties) if subjected to conventional fluid circulation or other high shear heat transfer actions. It also avoids unnecessary heating of the bulk of the deicing fluids stored in tanks on the deicer.

Rapid Heating Of A Mixture Of Water And Deicing Fluid

Figure 1:
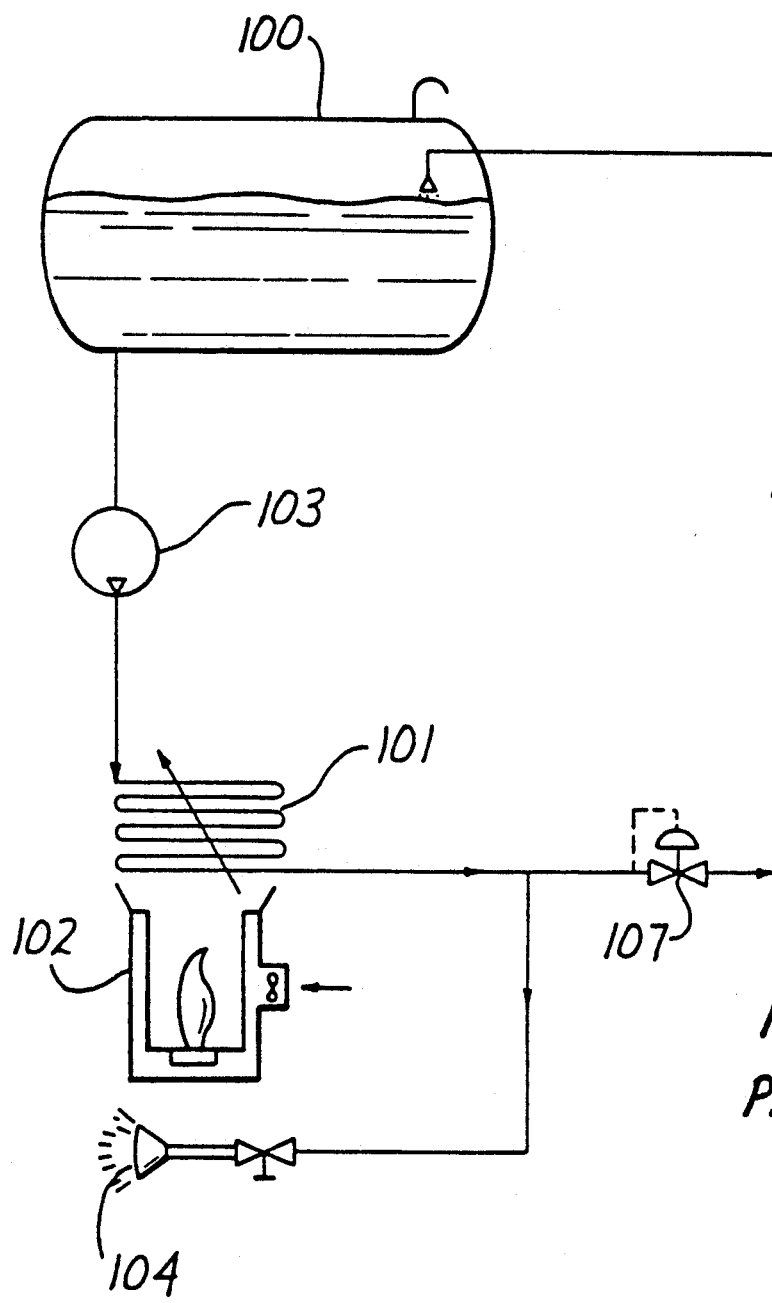
FIG. 1 is a simplified block diagram of a prior art deicing system.
Figure 2:
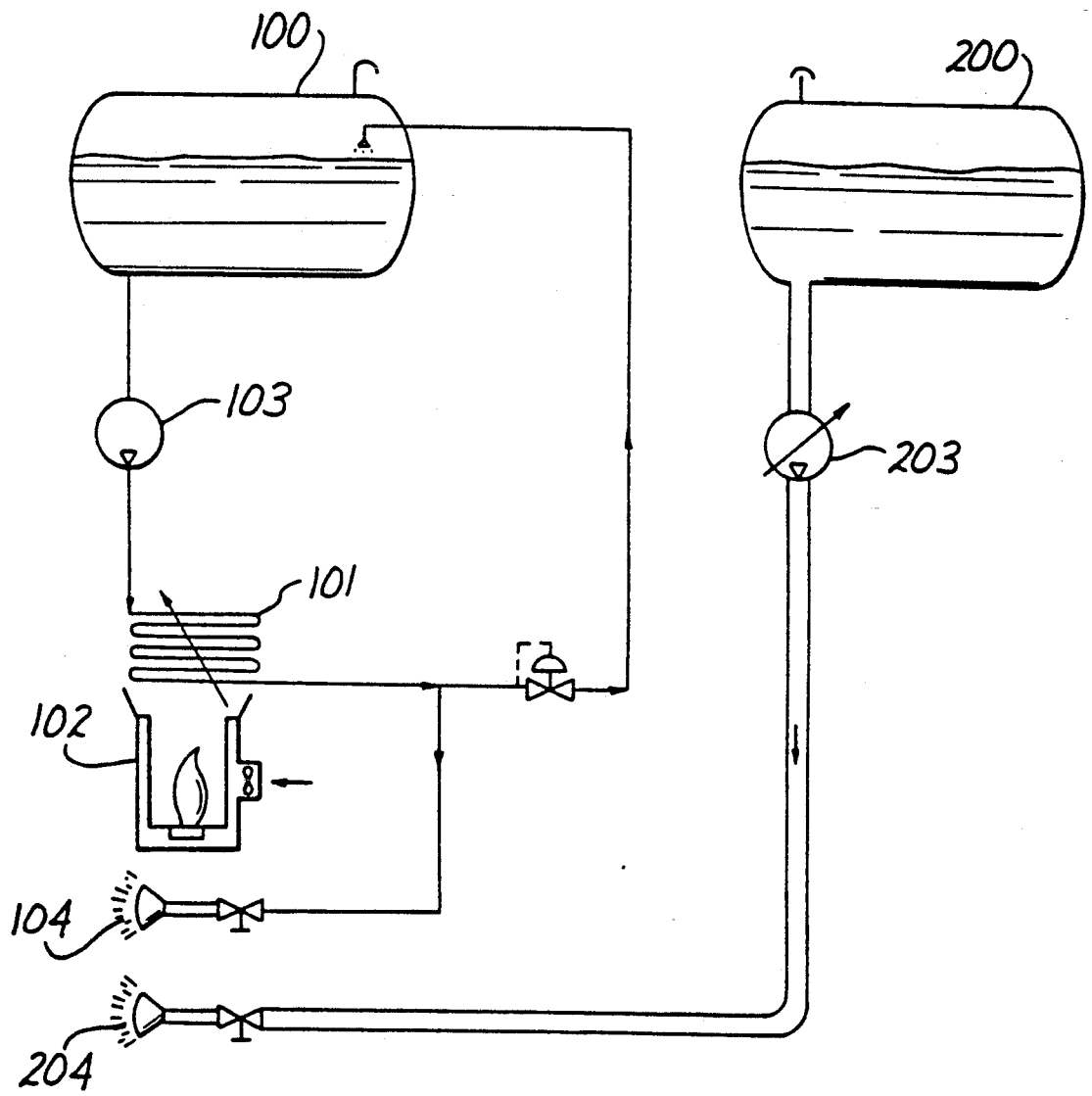
FIG. 2 is a simplified block diagram of a prior art modification of the system of FIG. 1.
Figure 3:
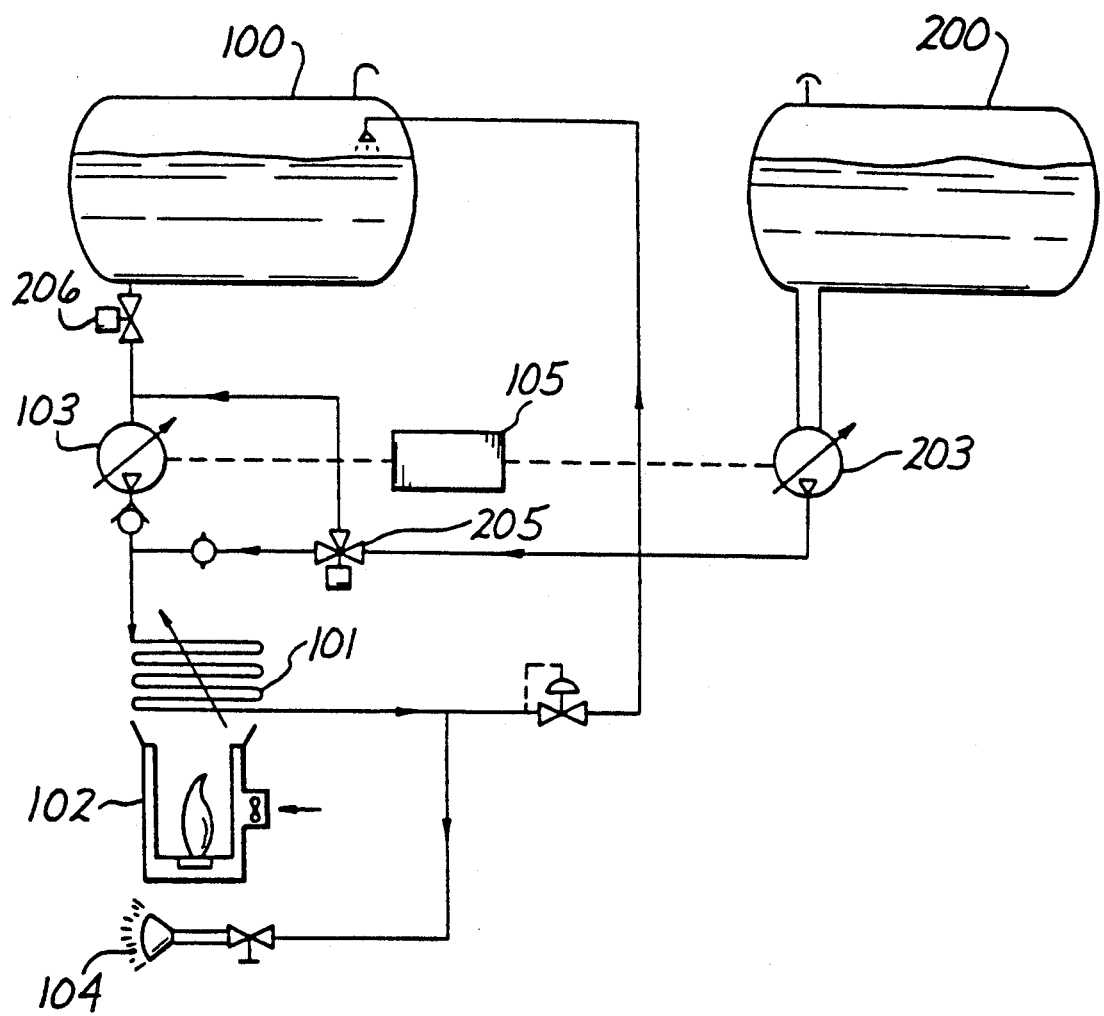
FIG. 3 is a simplified block diagram of a first embodiment of the invention.

One method of the present invention is illustrated in FIG. 3. Two fluids to be mixed and heated are stored in separate tanks 100 and 200. They are drawn from the tanks by pumps 103 and 203 in the desired proportions to the inlet of the heat exchanger 101 of a direct fired heater 102 where they are then heated in one pass. The proportions of the two fluids may be changed by a proportioning control 105 that varies the speed of the two positive displacement pumps 103 and 203, or by use of suitable valves, with or without flow metering devices. The heat exchanger 101 serves as both a fluid heating and mixing device. The burner and heat exchanger of heater 102 are sized so that when the fluid is pumped through the heat exchanger at the flow rate required for deicing the aircraft, the temperature of the fluid increases in one pass from the fluid storage temperature to the desired spraying temperature. The heat exchanger 101 is designed so that the turbulent flow through the heat exchanger will provide a uniform mixture at the heat exchanger outlet.

Another feature of the method shown in FIG. 3 is the use of valves 205 and 206. Valve 205 permits deicing fluid to flow through pump 103 and then through heat exchanger 101. Valve 206 permits deicing fluid to flow into the line connecting the water tank 100 to pump 103. Filling the lines, pumps and heat exchanger with deicing fluid provides antifreeze protection for the portions of the system that are filled with water during operation. This is desirable to avoid damage to the system during non-operating exposure to subfreezing temperatures.

This method of heating and mixing two fluids for deicing is applicable to water and Type I fluid which are not damaged by high heat exchanger surface temperatures and high velocity turbulent flow. It may not be applicable to heating and mixing water and Type II fluid because of mechanical and thermal degradation which may occur to the Type II fluid.

Rapid Heating Of Type II Mixtures With Anti-Icing

Figure 4:
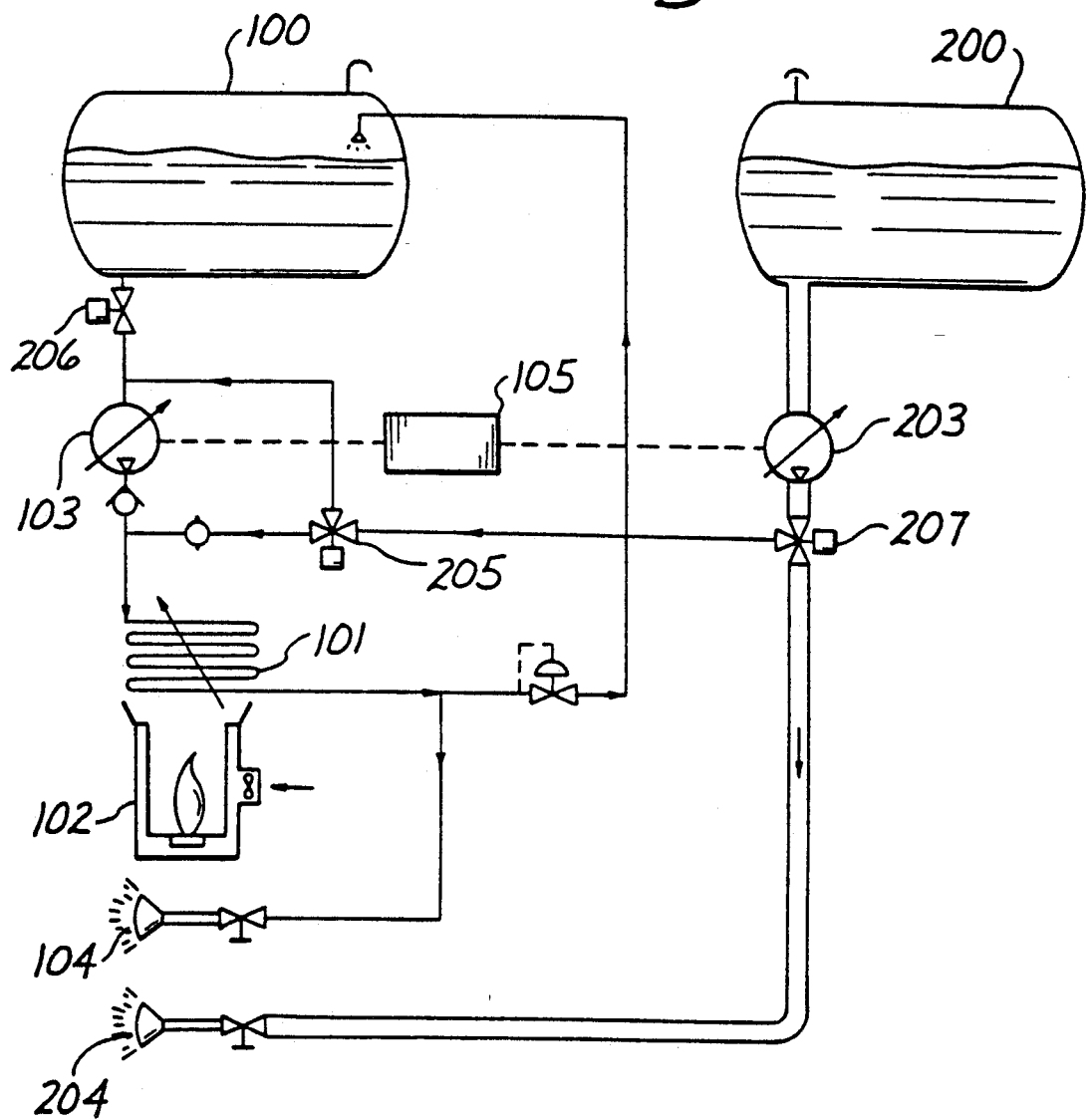
FIG. 4 is a simplified block diagram of a second embodiment of the invention.
Figure 5:
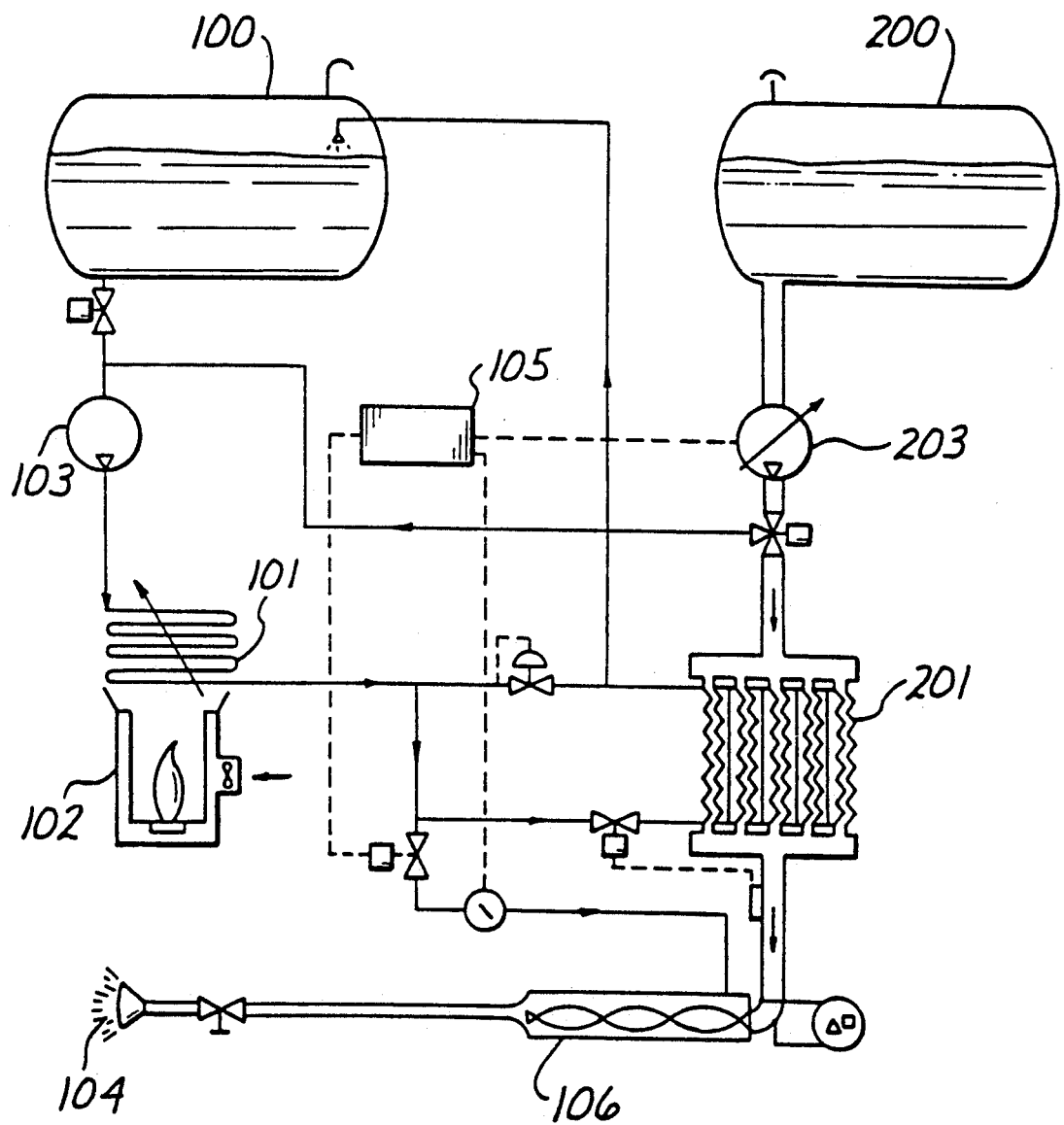
FIG. 5 is a simplified block diagram of a third embodiment of the invention.
Figure 6:
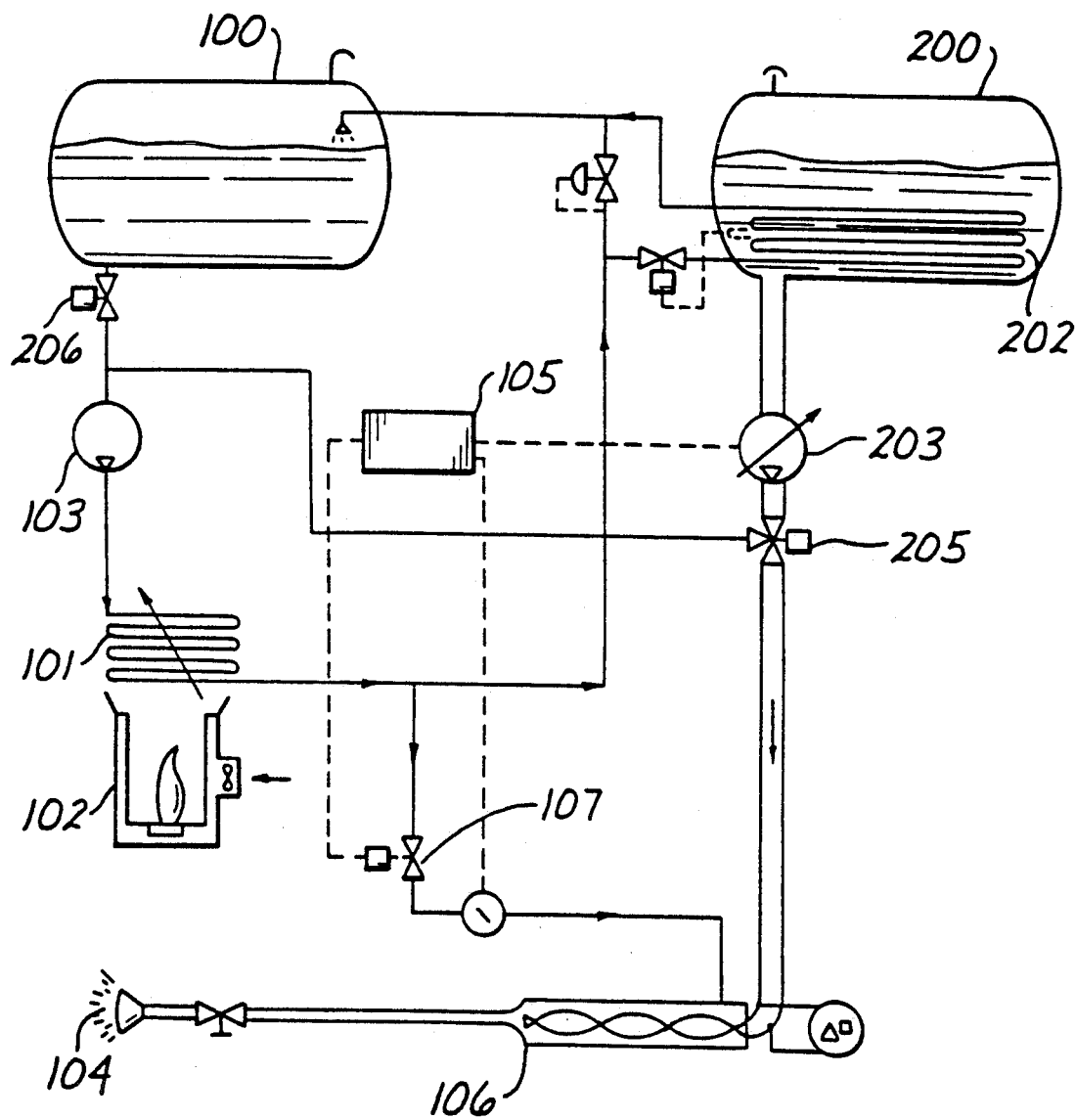
FIG. 6 is a simplified block diagram of a fourth embodiment of the invention.

Still another rapid heating system of the present invention is illustrated in FIG. 4. It involves a two-step deicing process in which water is mixed with deicing fluid and heated in a one-pass heater for rapid deicing through spray nozzle 104, as in FIG. 3, followed by application of cold Type II fluid for anti-icing through spray nozzle 204. Valve 207 determines the mode of operation. It can direct the deicing fluid to flow through valve 205 to mix with the water and be heated in heat exchanger 101 for deicing. Valve 207 can also direct the Type II deicing to flow through nozzle 204 for anti-icing.

The advantage of this method is that it can be used with Type II fluid without consideration of degradation during heating. Degradation of the Type II fluid arising from flow through heat exchanger 101 due to mechanical or thermal effects does not reduce the ability of the fluid to deice the aircraft. The cold Type II fluid which is used for anti-icing has not been degraded.

Rapid Heating Of Deicing Fluid By An External Heat Exchanger

Yet another rapid heating system of the present invention is shown in FIG. 5. This involves drawing water from one tank 100 through a pump 103. The water then flows through a heat exchanger 101 where it is heated in a single pass by a direct fired heater 102. A deicing fluid is drawn from a second tank 200 through a pump 203 and then passes through a counterflow heat exchanger 201 where a portion of the heated water flow is used to heat the deicing fluid flow. The balance of the hot water flow is then mixed with the heated deicing fluid flow in a flow-mixing device 106, and the hot mixture then flows to the spray nozzle 104 where it is sprayed onto the aircraft.

The water flows at the rate required for the total spray. The deicing fluid flows at the rate required for the desired mixture. For example, suppose it is desired to spray 60 gpm of a 50/50 mixture of water and Type II deicing fluid onto the aircraft. Then 60 gpm of water is pumped and heated. Thirty gpm of hot water is diverted to flow through the counterflow heat exchanger 201, while the balance of the water (30 gpm) flows to the mixer 106. The cooled water flows back to the tank. Thirty gpm of Type II fluid is drawn from tank 200 and pumped by pump 203 through the other side of the counterflow water/deicing fluid heat exchanger 201. The heated Type II fluid then mixes with the 30 gpm balance of the hot water flow in mixing device 106, and the total 60 gpm flow of the 50/50 mixture is sprayed onto the aircraft through nozzle 104.

Degradation of the Type II fluid as it passes through the external heat exchanger 201 can be avoided. Mechanical degradation can be avoided if the internal velocities are maintained at a low level, on the order of 6 feet per second, and if internal separation caused by irregular surfaces and other turbulence promoters are avoided. Thermal degradation can be avoided by keeping the maximum temperature on the hot water side of the heat exchange below 248 degrees F.

The method described here with an external heat exchanger is equally applicable to use with Type I deicing fluid and water mixtures.

Rapid Heating Of Deicing Fluid By An Internal Heat Exchanger

Another rapid heating method of the present invention which is particularly suited to Type II fluid is illustrated in FIG. 6. This method is similar in some respects to the method shown if FIG. 5, except that the water-to-deicing fluid heat exchanger 202 is located inside the deicing fluid tank 200. This method of heating will provide only slow heating of a low viscosity fluid such as Type I fluid, but it can provide rapid heating of a high viscosity fluid such as Type II deicing fluid. This requires not only the method illustrated in FIG. 6, but also the correct design of the heat exchanger 202.

Water is drawn from tank 100 through pump 102 at the total flow rate desired for deicing spraying. The water then flows through heat exchanger 101 where it is heated in a single pass by direct fired heater 102 to the desired temperature for heating the deicing fluid and for mixing with the deicing fluid for spraying. For approximately five minutes, the hot water flows upward through heat exchanger 202 located at the bottom of Type II deicing fluid tank 200. During this time the stationary Type II fluid enclosed by the heat exchanger 202 is preheated and the fluid at the bottom of the tank 200 reaches the desired temperature for mixing and spraying.

After the five minute preheat period, deicing can be initiated. Water flow control valve 107 is opened to allow the desired amount of hot water to flow to mixing device 106. The balance of the hot water continues to flow through heat exchanger 202 located in tank 200. At the same time, pump 203 draws Type II deicing fluid at the desired flow rate from tank 200. The counterflow of hot water upward and deicing fluid downward through heat exchanger 202 transfers heat from the hot water to the flowing deicing fluid and maintains the temperature of the deicing fluid leaving the tank 200 at the desired level.

The hot deicing fluid drawn from the tank flows to mixing device 106 where it is mixed with the water flowing through valve 107. The mixture is then sprayed on the aircraft through spray nozzle 104.

The water flows at the rate required for the total spray. The deicing fluid flows at the rate required for the desired mixture. For example, suppose it is desired to spray 60 gpm of a 50/50 mixture of water and Type II deicing fluid onto the aircraft. Then 60 gpm of water is pumped and heated. During the preheat period, the 60 gpm of water flows upward through the heat exchanger 202, heating the stationary Type II fluid.

When the deicing operation is initiated, 30 gpm of hot water flows through valve 107 to mixer 106. The other 30 gpm of hot water continues to flow through heat exchanger 202 and then back to the tank. Thirty gpm of Type II fluid is drawn from tank 200 by pump 203. As it moves down through tank 200, it flows through heat exchanger 202 and continues to be heated to the desired discharge temperature by the equal counter flow of hot water.

The 30 gpm of heated Type II fluid then mixes with the 30 gpm of hot water flow in mixing device 106, and the total 60 gpm flow of the 50/50 mixture is sprayed onto the aircraft through nozzle 104.

Degradation of the Type II fluid as it passes through the internal heat exchanger 202 is avoided because of the low velocity of the fluid through the heat exchanger 202 and the low temperature of the heated surfaces of heat exchanger 202.

Heat Exchanger For Rapid Heating Of Type II Fluid In A Tank

An important part of the present invention is the design of a heat exchanger for rapid heating of Type II fluid in the tank of a deicer as described in paragraph 5.6 above.

Several unsuccessful attempts at heating Type II fluid by heat exchangers located in the Type II fluid tank have been made by persons who did not understand the nature of the fluid they were trying to heat. The present invention not only takes the nature of the fluid into account, but also makes use of the fluid's properties to heat only that portion of the fluid which is about to be pumped.

Behavior Of Type II Fluid When Heated In A Tank

Type II deicing fluid stored in a tank does not behave in the same way as fluid with much lower viscosity such as water, ethylene glycol, or premixed Type I fluids. The viscosity of the Type II fluid at rest is very high, on the order of 8000 cp as compared to water which has a viscosity of 1 cp, or Type I fluid which has a viscosity of about 300 cp. The extremely high static viscosity of Type II fluid is what allows it to cling to the wings and other surfaces of aircraft to provide anti-icing protection after the deicing process has been completed. This high viscosity, however, also effectively eliminates thermal convection in the fluid.

When water or some other low viscosity fluid is heated in a tank or other container, the heat can be introduced into the tank by heating the bottom surface, or by means of heated tubes or other surfaces distributed across the bottom surface of the tank. When the fluid in the bottom of the tank is heated, the hot fluid rises because of its reduced density compared to the cooler fluid. This sets up a thermal convection process in the tank which effectively stirs the fluid in the tank. Thermal convection greatly enhances heating of the tank fluid and tends to eliminate thermal gradients in the tank.

A very different situation arises with a tank full of a high viscosity material such as Type II deicing fluid. When Type II fluid is heated, its density decreases, but its viscosity is so high that the fluid tends to remain stationary and little or no thermal convention occurs. The reduction in density produces buoyant forces just as it does with other fluids such as water. The buoyant forces cannot produce significant motion of the fluid which is virtually locked into place by virtue of the pseudoplastic viscous nature of the fluid. Under these circumstances, the only effective mode of heat transfer to the fluid is conduction. The fluid in contact with the heat source approaches the heat source temperature, while fluid a short distance away may take much longer to be heated.

Heat Exchanger Design Considerations

One type of heat exchanger design located internal to the tank that can produce the desired rapid heating is the so-called finned tube design. A typical design consists of a plurality of tubes that are connected to a common inlet header. The tubes are parallel to each other lying in a common horizontal plane that extends across the tank for some distance. This row of tubes is then connected by means of return bends to a second row of tubes which lie in a second plane located above the first row. These tubes are in turn connected by return bends to a third row located above the second, and so on. The top row of tubes are connected to a common exit header. A series of vertical sheet metal fins are mechanically connected to the tubes. The fins extend from below the bottom row of tubes to above the top row of tubes. The entire structure creates an array of heat transfer surfaces with one fluid contacting the inside of the tubes while the other fluid contacts the surfaces of the fins and the outside surfaces of the tubes. In the present application a finned tube heat exchanger may be located at the bottom of the deicing fluid tank covering a portion or even substantially all of the bottom surface, so that the deicing fluid must pass vertically through the heat exchanger in order to leave the tank. The deicing fluid is heated by hot water which enters the bottom row of tubes through the header at the bottom of the heat exchanger. It flows upwards through the heat exchanger and leaves through the header connected to the top row of tubes.

Because the fluid remains essentially stationary in the tank, the fluid between the fins of the heat exchanger behaves in a manner similar to a solid plate being heated by conduction. The time variation of the temperature distribution between the heated surfaces is a function of the square of the spacing between the fins. Reducing the spacing by a factor of two decreases the heating time by a factor of four. By using closely spaced plates, the fluid in the tank can be heated rapidly even though the conductivity of the fluid is low.

As the hot water flows upwards through the heat exchanger, the water is cooled by heat loss to the deicing fluid. This creates a vertical temperature distribution through the heat exchanger. By proper design, the heated portion of the deicing fluid can be confined to the bottom of the tank. This avoids the undesirable heating of deicing fluid which will not be sprayed. It also keeps the fluid at the top of the tank cool so that undesirable dehydration of the Type II fluid does not occur.

Figure 7:
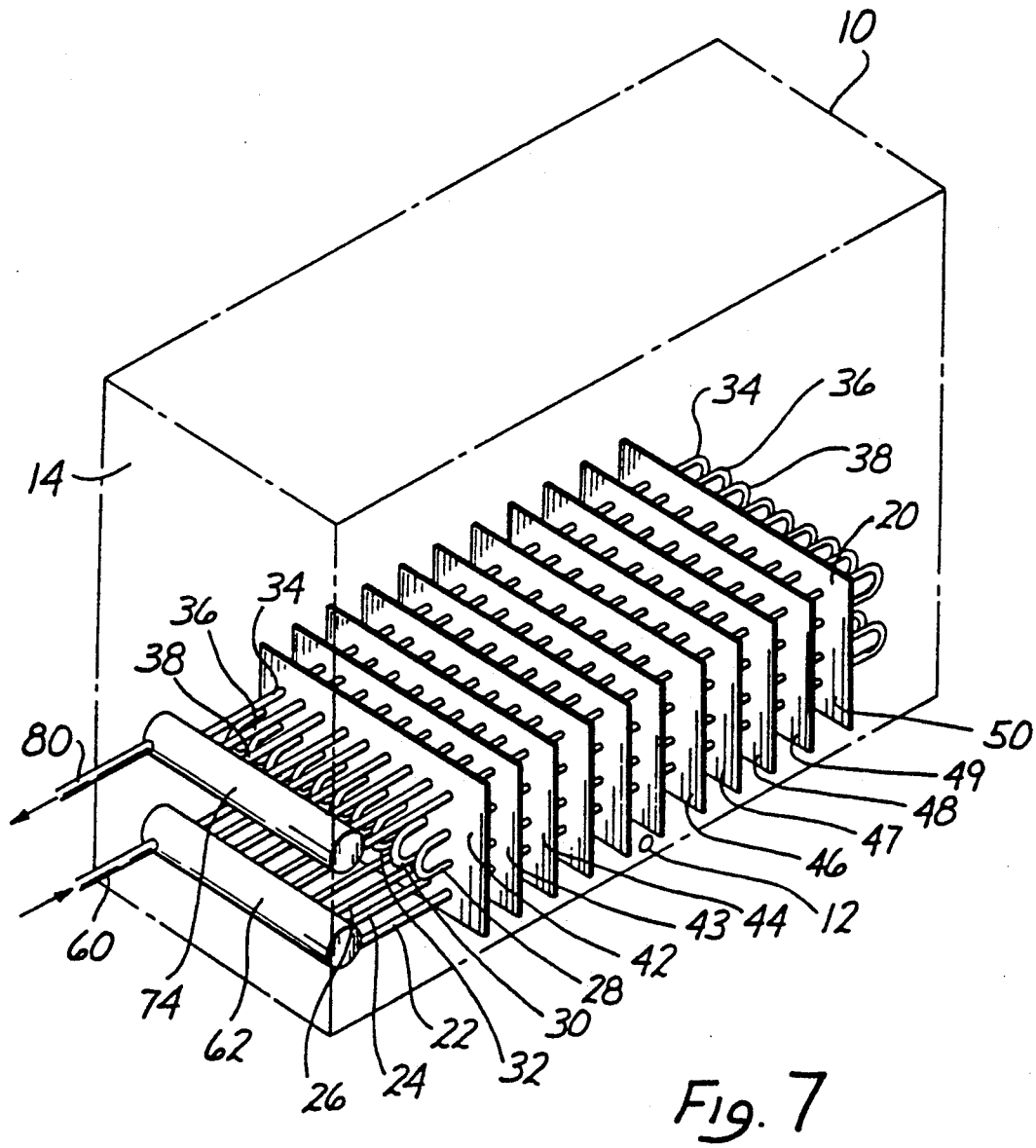
FIG. 7 is a perspective view of the preferred embodiment of the heat exchanger of the invention.

A preferred embodiment of the present invention includes a heat exchanger 20 located at the bottom of a tank 10 containing Type II deicing fluid 14. Tank 10 has an outlet valve 12 through which fluid 14 may be emptied. Heat exchanger 20 is comprised of several rows of horizontally arranged tubes 22-40 connected through and thermally coupled to a series of thin vertical fins 42-50, as shown in FIG. 7. An inlet header 60 is connected to the bottom row of tubes 22-26 by means of suitable distributor 62. Bottom row 22-26 of tubes is connected to the second row 28-32 and then to the next row and so on up to the top row 34-38 of tubes of the heat exchanger which is connected by collecting tube 74 to an exit header 80.

At the start of operation of the heating system, valve 12 is closed. Fluid 14 in tank 10 is heated while it is stationary in tank 10. A heating fluid, such as hot water, flows through the inlet header 60 to bottom row of tubes 22-26, then flows upward through successive rows of heat exchanger 20, finally leaving through exit header 80 which receives fluid 14 from top row of tubes 34-38.

As the hot water flows upward through tubes 22-38 of heat exchanger 20, heat is transferred from the hot water to the walls of tubes 22-38 and then to Type II fluid 14 in contact with the outside of tubes 22-38. Heat is also transferred from the walls of tubes 22-38 to fins 42-50 which are part of heat exchanger 20. Heated fins 42-50 then transfer heat to the portion of Type II fluid 14 which is in contact with fins 42-50. Heat is then transferred to the remaining portion of Type II fluid 14 by conduction.

Figure 8:
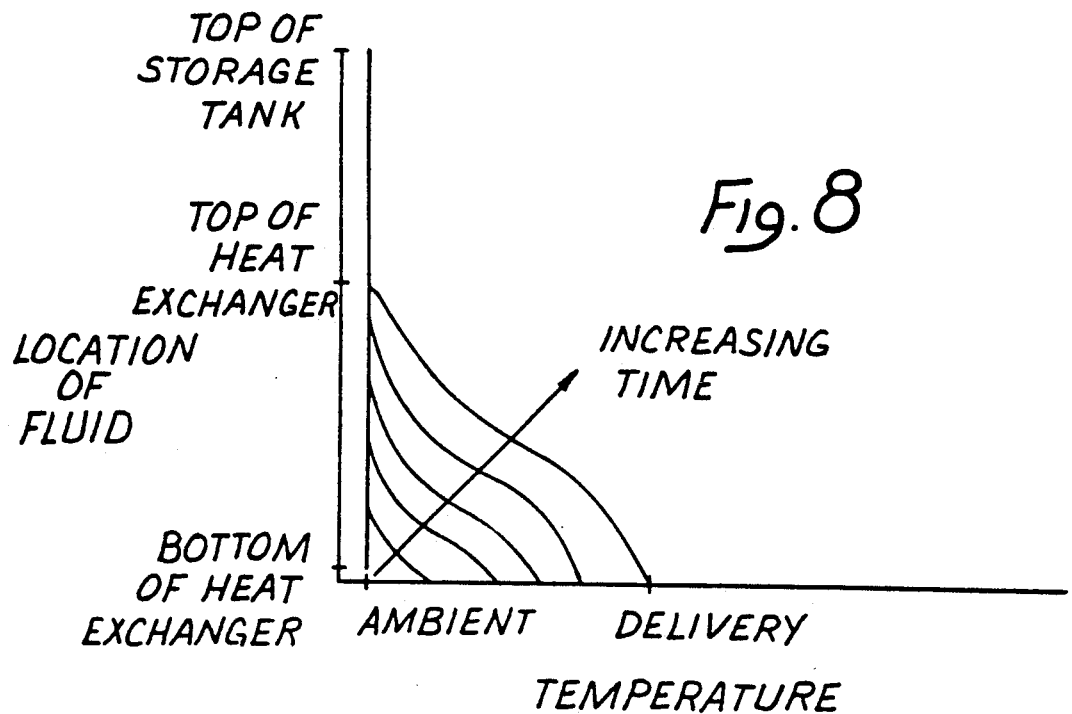
FIG. 8 is a graphic representation of the transient temperature distribution of the deicing fluid during the preheating stage.

As heat is transferred by conduction through the quasi-stationary Type II fluid 14, the temperature distribution within fluid 14 changes. FIG. 8 illustrates the transient temperature distribution within Type II fluid 14 as the heating process occurs.

Initially all of fluid 14 is at its initial ambient temperature, usually at or below 32 degrees Fahrenheit. Then as the hot water starts to flow through heat exchanger 20, heating of the Type II fluid begins and the temperature of that portion of fluid 14 at the bottom of tank 10 starts to rise. Because the hot water loses heat only to that portion of fluid 14 at the bottom of tank 10 which is conductively heated, the portion of fluid 14 at the top of tank 10 is not initially heated.

As heating continues, the temperature of that portion of fluid 14 at the bottom of tank 10 continues to rise, but some heat is retained by the hot water as it flows through tubes 22-38 of heat exchanger 20, and the temperature of fluid 14 at higher levels in tank 10 also begins to rise. This process continues, and the temperature distribution in tank 10 changes as shown in FIG. 8. The vertical axis of the graph of FIG. 8 is location of the fluid in the tank as measured from the bottom of the heat exchanger. The horizontal axis is the temperature of the fluid. The family of curves depicted is the temperature distribution through the heat exchanger and tank with each curve being a snapshot taken at a different time from the start of heating. Time increases as the position of the curve moves up and to the right in the graph as suggested by the arrow labeled, "increasing time."

After a period time the temperature of fluid 14 at the bottom of tank 10 reaches the desired spraying temperature, labeled "delivery". The time required to reach this temperature depends on the flow rate of the hot water used for heating, and the design of heat exchanger 20. That portion of fluid 14, which heats the slowest, is located halfway between fins 42-50. The transient behavior of the temperature at this midpoint is a function of the properties of the fluid (conductivity, density and specific heat) and the spacing between the fin surfaces. The time required to reach a given fraction of the final temperature rise depends inversely on the square of the distance of the fin spacing. By choosing a sufficiently small fin spacing the heat can be distributed quickly into the body of fluid 14.

By proper design of the system, including adequate flow of hot water, adequate surface area in the heat exchanger, and close enough spacing of the fins, the temperature of the Type II fluid at the bottom of the tank can reach the temperature suitable for spraying within a short period of time. For example, by using a heat exchanger with ten staggered rows of ½" tubes located at 1.25 inches on centers, with 1.08 inch vertical spacing between rows with ten fins per inch and 0.006 inch fin thickness, a flow rate of 30 gpm of 200 degree F. water can heat the fluid at the bottom of a 33"×84" tank from zero up to 160 degrees F. within five minutes.

The temperature of the fluid in the tank will decrease with height, so the fluid located at a height of 10" from the bottom of the tank will only reach a temperature of 30 degrees F. within the same five-minute period. The temperature distribution of the fluid in the tank at the end of the preheat period is also shown in FIG. 8.

After fluid 14 has been preheated in the tank as described above, valve 12 is opened and the fluid may be pumped from the bottom of tank 10 for use in deicing and/or anti-icing the aircraft. As the fluid is pumped from the bottom of tank 10, it flows or moves over the heat exchanger surfaces resulting in heat transfer by forced convection from tubes 22-38 and fins 42-50 into fluid 14.

Figure 9:
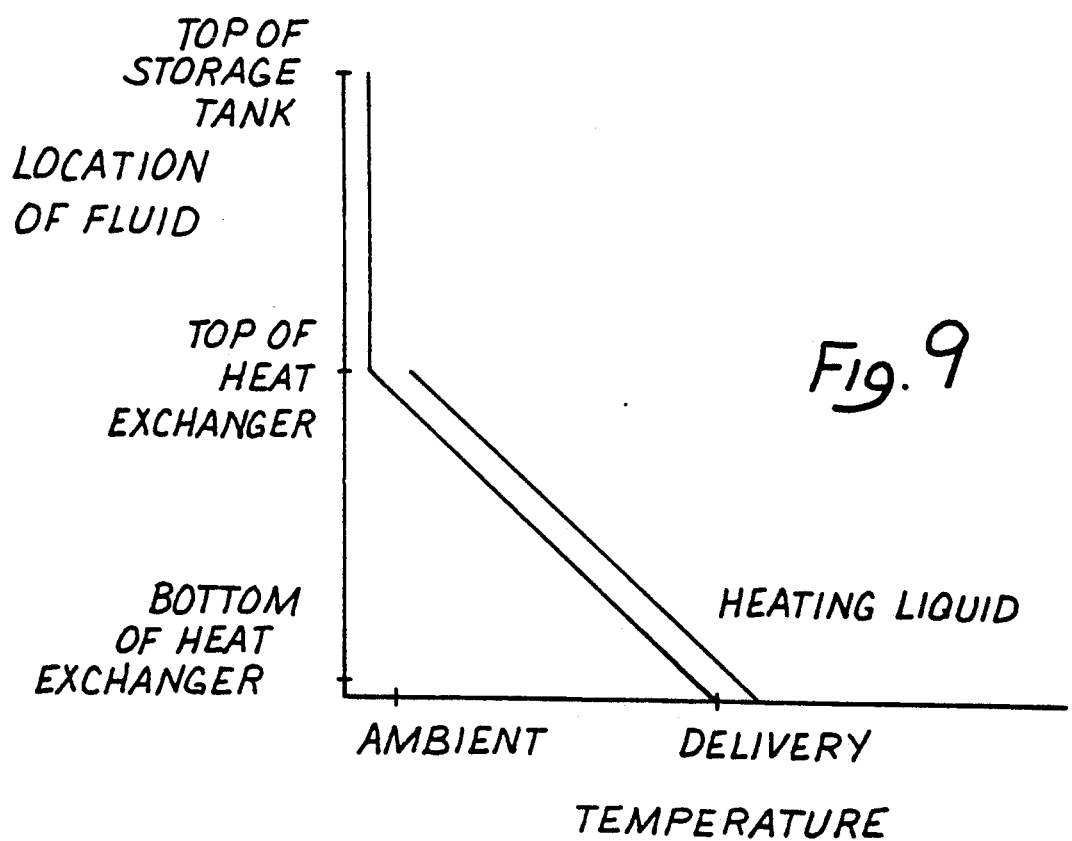
FIG. 9 is a graphic representation of the temperature distribution of the deicing fluid during the continuous pumping stage.

As the forced convection continues, the steady state temperature distribution of Type II fluid 14 at the bottom of tank 10 is shown in the graph of FIG. 9. The vertical and horizontal axes of the graph of FIG. 9 are the same as those shown in FIG. 8. By proper design of the heat exchanger 20, the temperature distribution shown in FIG. 9 will be almost the same as or generally similar to the temperature distribution reached during the preheat transient prior to pumping as shown in FIG. 8.

Suppose, for example, we want to pump Type II fluid at 160 degrees F. (at this temperature the fluid will not degrade), with an initial storage temperature of 35 degrees F. During a five-minute preheat period, the temperature of fluid 14 in tank 10 varies as shown in FIG. 8. At the end of the preheat period, the fluid at the bottom of the tank has reached 160 degrees F. The fluid is then pumped from the tank for spraying. The temperature distribution in the tank during steady flow of fluid from the tank is also shown in FIG. 9.

As the pumping continues, fluid 14 flowing from tank 10 will initially be at 160 degrees F., the temperature reached during preheating. Then the temperature will increase slightly as convective heating raises the temperature of the preheated fluid. Finally, the temperature will approach the steady state temperature reached by free convection. By proper design of the heat exchanger, this steady state temperature will also be 160 degrees F.

While the use of an in-tank heat exchanger requires a short preheat time, it has the advantage of providing rapid heating with a minimum of mechanical or thermal degradation to the fluid. The water used for preheating is at a low temperature which does not degrade the Type II fluid. The velocity of the fluid as it passes through the in-tank heat exchanger is very low, and hence no significant degradation due to mechanical shear occurs.

The invention is not limited to the embodiments described above, but all changes and modifications thereof, not constituting departures from the spirit and scope of the invention are intended to be included. For example, the heat exchanger of FIGS. 7-9 need not be utilized in the heating systems of FIGS. 3-6. However, in those applications where a psuedoplastic deicing fluid is used the heat exchanger of FIGS. 7-9 can be used to good advantage. In one test using Type II deicing fluid, the fluid was pumped from a ground storage tank at ambient, into a deicing storage tank, through a heat exchanger of the design described above in the bottom of the deicer tank, and pumped through a spray nozzle at 180 degree Fahrenheit with approximately only 6-8% degradation in the fluid viscosity at the site of application as compared to the viscosity in the ground storage tank. Flow rates through the heat exchanger were approximately 2 inches per minute, well below the 6 foot per second limit for the fluid.

I claim:

1. A method of rapidly heating fluid from an ambient storage temperature to a delivery temperature and delivering a continuous flow of said fluid at said delivery temperature comprising the steps of:

storing a quantity of said fluid in a storage tank, said tank having outlet means and a heating area within said tank adjacent said outlet means, said outlet means having a closed position wherein fluid remains stationary in said tank, and further having an open position wherein said fluid flows out of said tank through said outlet means;

creating a predetermined dynamic temperature pattern within said fluid when said outlet means is in said closed position, said predetermined dynamic temperature pattern being defined by the fluid in a delivery area in said tank closest to said outlet means, said fluid in said delivery area being heated to said delivery temperature, the fluid in a stored area in said tank farthest from said outlet means being at said ambient storage temperature, and the fluid between said delivery area and said stored area approaching said delivery temperature according to its relative distance from said outlet means;

creating a predetermined steady state temperature pattern within said fluid when said outlet means are in said open position, said predetermined steady state temperature pattern being defined by the fluid flowing through said outlet means being at said delivery temperature, the fluid flowing through said delivery area being heated to said delivery temperature, and the fluid flowing from said stored area to said delivery area being heated to approach said delivery temperature according to its relative distance from said outlet means.

2. A method of heating and delivering psedoplastic fluid comprising:

storing a quantity of pseudoplastic fluid in a storage tank at an ambient storage temperature, said pseudoplastic fluid having material properties wherein it has a relatively stationary consistency at said ambient storage temperature and wherein its flow rate increases as its temperature rises, said tank having outlet means and further having a heating area within said tank adjacent said outlet means, said outlet means having a closed position adapted to contain said fluid within said tank, and further having an open position adapted to allow said heated fluid to flow out of said tank through said outlet means;

rapidly heating the fluid in said heating area from said ambient storage temperature to a delivery temperature; and selectively delivering a continuous flow of said fluid at said delivery temperature, wherein said step of rapidly heating comprises: creating a predetermined dynamic temperature pattern within said fluid when said outlet means are in said closed position, said predetermined dynamic temperature pattern being defined by the fluid in a delivery area in said tank closest to said outlet means being heated to said delivery temperature, the fluid in a stored area in said tank farthest from said outlet means being at said ambient storage temperature, and the fluid between said delivery area and said stored area approaching said delivery temperature according to its relative distance from said outlet means;

and said step of delivering comprises: creating a predetermined steady state temperature pattern within said fluid when said outlet means are in said open position, said predetermined steady state temperature pattern being defined by the fluid flowing through said outlet means being at said delivery temperature, the fluid flowing through said delivery area being heated to said delivery temperature, and the fluid flowing from said stored area to said delivery area being heated to approach said delivery temperature according to its relative distance from said outlet means.

3. The method of claim 2 wherein said pseudoplastic fluid is deicing fluid.

4. The method of claim 3 wherein said steps of creating predetermined temperature patterns within said fluid comprise:

positioning a heat exchanger adapted to allow liquid to flow therethrough in said heating area; and heating a liquid outside of said tank; and pumping said heated liquid into said heat exchanger along a path adjacent said outlet means and then progressively farther away from said outlet means for a time period sufficient to create a temperature profile in said heat exchanger approximating a dynamic temperature profile maintained in said heat exchanger when said fluid moves through said heat exchanger at a predetermined rate, wherein heat is transferred from said liquid to the walls of said heat exchanger and to said fluid in said heating area.

5. A method for rapid heating of two fluids comprising the steps of:

storing an unheated first fluid in a first tank;

storing an unheated second fluid in a second tank;

drawing said first fluid from said first tank into a first heat exchanger;

heating said first fluid in said first heat exchanger to a delivery temperature;

providing a first portion of said heated first fluid to a second heat exchanger;

drawing said second fluid from said second tank into said second exchanger at a flow rate approximately equal to the flow rate said heated first fluid is supplied to said second heat exchanger;

heating said second fluid by heat exchange with said first portion of said heated first fluid in said second heat exchanger;

mixing a second portion of said heated first fluid with said heated second fluid; and delivering said mixed and heated first and second fluids to an application site.

* * * * *